Figure 1:
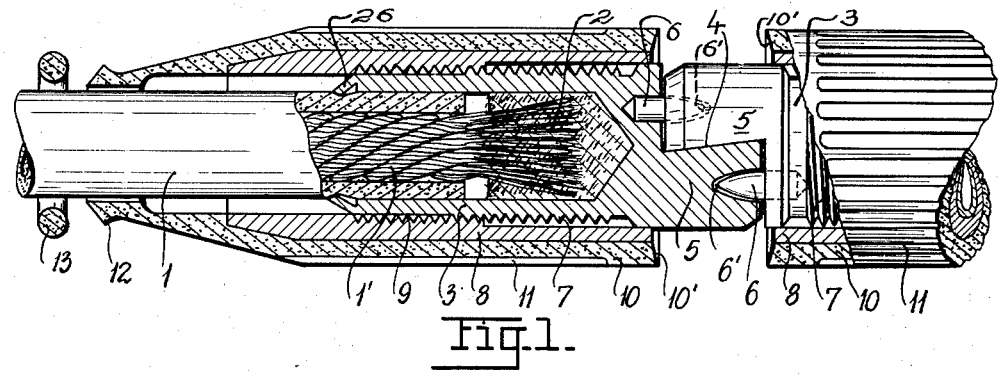

April 1, 1952  E. H. JUN  2,591,437

COUPLING DEVICE FOR ELECTRIC CABLES

Filed Feb. 27, 1947

*INVENTOR*
ERIK HAUGSRUD JUN.

BY Otto Munk
HIS ATTY

Patented Apr. 1, 1952

2,591,437

UNITED STATES PATENT OFFICE 2,591,437

COUPLING DEVICE FOR ELECTRIC CABLES

Erik Haugsrud Jun, Bagn, Norway

Application February 27, 1947, Serial No. 731,259
In Norway December 21, 1946

5 Claims. (Cl. 173—363)

The present invention relates to a coupling device for electric cables especially of the type used for connecting (joining) cable sections, for instance for electric welding or for portable electric machines.

Cable couplings to be used in plants, work shops, ship-building yards and the like for connecting electric welding equipments should be subjected to a series of conditions, as well regarding electrical as mechanical properties and in addition thereto conditions of a merely practical kind. Specially should be mentioned that this type of coupling should comprise as few parts as possible and no loose part which might be lost when disconnected. It should preferably be provided with similarly shaped pairs of parts so that any end of one cable might be connected with any end of another one. Twist of the cable should not cause disconnection, neither should the cable otherwise be capable of disconnecting itself. Furthermore, it should be so compactly and solidly constructed that it does not break if run over by the wheel of a motor car but should eventually slip away. For this reason it should not be provided with protruding parts or edges which might be entangled. All threads should be covered both in connected and disconnected position to prevent them from being damaged or filled with dirt.

Simultaneously, no threads should exist in the contact area which might be subjected to being burnt by test connection. An effective relief of tension should be provided for in such way that tensil forces in the cable, for instance hauling forces should be transferred to the coupling directly and not expose the strands of the cable core to mechanical strain in the section which has become brittle from the soldering process. At the same time hauling forces should contribute to increase the contact pressure, i. e. press the contacts more heavily together, and the contacting surfaces in its entirety be easily open to inspection and cleaning and should at the same time be adapted to be completely covered or protected against damage when the coupling is disconnected. The contacting surfaces should be highly over-sized so that, at a high contact pressure, a heating from contact resistance is avoided.

None of the coupling devices for electric cables so far known satisfies all these conditions. The coupling device according to the invention is thereby characterized that the contact surfaces of separating surfaces between the coupling members are shaped in such a way that they might be brought together without twisting movement between the two coupling members same overlapping and engaging each other in such a way that tension in the cable (for instance hauling forces) contributes to increase the contact pressure. An essential feature of the invention consists in the two parts of the coupling being identical.

Figure 2:
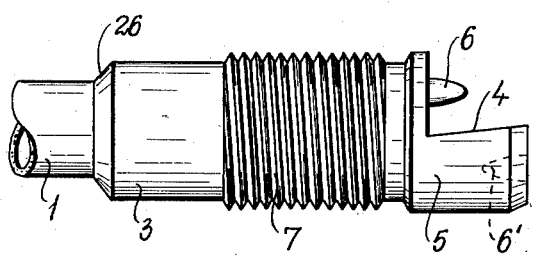
Figure 3:
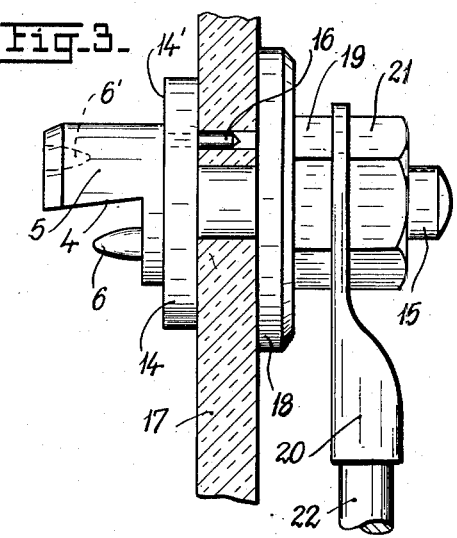

Various embodiments of the invention are reproduced in the drawings wherein Figure 1 shows a sectional view of a connecting device for two cable ends. Figures 2 and 3 a connection between one cable end and a contact board.

In Figure 1 the exterior rubber sheath is designated by 1 and its strand shaped conductor by 1'. The soldering-in of the end is designated by 2 and shows that the outer strands are spread from each other in order to obtain intimate contact with the solder. The cable end is shown soldered-in in the bottom of a tube-shaped casing 3 terminating in a coupling head 5 having an inclined contact surface 4. The head 5 has been fashioned from a cylindrical rod of which one half of the outer end has been milled away so that an inclined contact surface 4 is obtained which forms an acute angle with the central axis of the coupling device. This head 5 is connected with a precisely similarly shaped head 5 at the other cable end in such a way that the missing part of the cylinder is mutually filled out by the other head. For the centring of the two heads each one is provided with a pin 6 and a hole 6'. The pin is engaging a corresponding hole 6' in the opposite head of which the pin 6 is designed for the first mentioned hole 6'. The pins are formed like cones where the angle between the base and the generatrice is equal to or smaller than the angle between the base and the contact surface 4 to prevent mutual blocking up.

The casing 3 is to be considered as a backwards directed tube-shaped extension of the head 5 and this portion 3 is provided with external threads 7 over one part of its length. To the outside of the tube 3 is adapted a sleeve or socket 8 provided with corresponding internal threads 9 and which might be screwed over the tube 3 and the coupling head 5. When the sleeve is turned in a direction moving it over the head 5 it will act as blocking device for the two coupling heads and prevent the disconnecting of same. In the present case the coupling device of each cable end is provided with two similar sleeves 8 which are screwed against each other and thereby not only serving the object of maintaining the both coupling heads in relation to each other but also of providing an axially directed tension which increases the contact pressure on the separating surface 4.

Externally the sleeve 8 is provided with a coating 10 of rubber with grooves 11 to prevent slipping in the hand during the screwing movement. This exterior rubber coating 10 has a backwards directed tapered extension terminating in a bulge 12 fitting on the cable sheath. To provide for a sealing between the rubber coating and the cable sheath a ring 13 for instance of rubber, might be pushed over the bulge 12 to press the tapered end tightly to the sheath.

To obtain an absolutely watertight connection water must also not be allowed to penetrate to the separating surface between the two sleeves 8 which in the present case is obtained thereby that the rubber coating 10 is of a somewhat greater length than the sleeve 8 as indicated at 10'. These two surfaces 10' are getting in contact with each other and provide for the necessary sealing.

Figures 2 and 3 show the connection of a cable end 1 to a contact board 17. The two coupling heads are exactly executed in the same way as described in connection with Figure 1. The cable end is connected with the coupling head in the same way as previously described while the coupling head on the board 17 is provided with a somewhat larger flange 14 and a screw bolt 15 extending through the board 17 and secured to same by means of a washer 18 and a nut 19. To prevent the coupling head from turning in relation to the board 17 the flange 14 is provided with a pin 16 entering the board next to the hole for the bolt 15. Between the nuts 19 and 21 is in the usual way secured a cable shoe 20 attached to a cable 22 which for instance might be connected with one side of a welding transformer.

To simplify the matter the sleeve 8 has been omitted in Figure 2. When this sleeve is screwed over the threads 7 and is moved along the combined coupling heads 5 its end will be forced against the frontside 14' of the flange 14 and thereby bring about as well the necessary sealing as the necessary tensil force to produce a satisfactory contact pressure between the surfaces 4.

I claim:

1. A cable connector comprising an elongated metallic terminal constructed to receive a cable at the rear end thereof and having a front contact portion shaped for axially interlocking engagement with an inverted similar contact portion, said terminal being provided with an external screw thread at the circumferential surface thereof, and a sleeve provided with an internal screw thread for engagement with said external screw thread and screwable along said terminal between a first position sufficiently far behind the front end of said terminal to allow the contact portion thereof to enter into engagement with an inverted similar contact portion and a second position in which the front end of said sleeve extends beyond the front end of said contact portion.

2. A cable connector as in claim 1 and in which said sleeve comprises an internal metallic sleeve member and an external insulating covering projecting slightly beyond the front end of said metallic sleeve member.

3. A cable connector as in claim 1 and in which said sleeve comprises an internal metallic sleeve member and an external insulating covering extending beyond the rear end of said metallic sleeve member to form a tapering flexible sleeve portion adapted to enclose a cable connected to said terminal, the cable connector further comprising a ring constructed to fit loosely on such cable and to be slidable therefrom onto the rear end of said flexible sleeve portion to press the latter into sealing engagement with the cable.

4. A cable joint comprising two externally threaded metallic terminals having complementary interlocking contact portions at the respective front ends thereof and each being constructed to receive a cable at the rear end thereof, and a sleeve individual to each terminal, such sleeve having an internal screw thread for engagement with the external screw thread of the appertaining terminal and being screwable along the latter between positions in which the front end of said sleeve is located entirely in front of and behind the contact portion of the considered terminal respectively.

5. An electrical joint comprising a first and a second coupling member formed at the respective front ends thereof with mutually similar complementary surfaces shaped for axially interlocking engagement of said coupling members, means associated with said first coupling member forming a fixed abutment located sufficiently far behind the front end of such coupling member to allow interlocking engagement to be established between same and said second coupling member, an external screw thread formed at the circumferential surface of said second coupling member, and a sleeve provided with an internal screw thread for engagement with said external screw thread and screwable along said second coupling member between a first position with the front surface thereof engaging said fixed abutment and a second position sufficiently far behind the front end of said second coupling member to allow interlocking engagement to be established between same and said first coupling member.

E. HAUGSRUD JUN.

REFERENCES CITED

The following references are of record in the file of this patent:

UNITED STATES PATENTS

| Number | Name | Date |
|---|---|---|
| 309,324 | Vanduzen | Dec. 16, 1884 |
| 867,312 | Shutz | Oct. 1, 1907 |
| 904,522 | Firmin | Nov. 24, 1908 |
| 925,293 | Cheney | June 15, 1909 |
| 1,109,016 | Quin | Sept. 1, 1914 |
| 1,620,693 | Royal | Mar. 15, 1927 |
| 1,965,151 | Mueller | July 3, 1934 |
| 1,975,244 | Wiseman | Oct. 2, 1934 |
| 2,082,986 | Staley | June 8, 1937 |
| 2,093,037 | Douglass | Sept. 14, 1937 |
| 2,127,544 | Von Holtz | Aug. 23, 1938 |
| 2,346,831 | Drury | Apr. 18, 1944 |